United States Patent [19]
Ueltzen et al.

[11] Patent Number: 5,430,793
[45] Date of Patent: Jul. 4, 1995

[54] APPARATUS AND METHOD FOR CONFIGURING A COMPUTER SYSTEM AND A MODEM FOR USE IN A PARTICULAR COUNTRY

[75] Inventors: Ken Ueltzen, Rocklin; Andrew M. Mahan, Sacramento; John A. Horn, Davis, all of Calif.

[73] Assignee: Intel Corporation, Santa Clara, Calif.

[21] Appl. No.: 201,650

[22] Filed: Feb. 25, 1994

[51] Int. Cl.$^6$ .............................. H04M 11/00
[52] U.S. Cl. ...................... 379/98; 379/441; 379/93; 375/222
[58] Field of Search ............ 379/90, 91, 93-98, 379/100, 441-443; 375/8

[56] References Cited

U.S. PATENT DOCUMENTS

| | | | |
|---|---|---|---|
| 4,788,717 | 11/1988 | Blanchard et al. | 379/98 |
| 4,841,561 | 6/1989 | Hill | 379/97 |
| 4,868,863 | 9/1989 | Hartley et al. | 379/98 |
| 5,101,428 | 3/1992 | Koue | 379/100 |
| 5,134,648 | 7/1992 | Hochfield et al. | 379/98 |

FOREIGN PATENT DOCUMENTS 61-269546  11/1986  Japan ...................... 379/97

*Primary Examiner*—Wing F. Chan
*Attorney, Agent, or Firm*—Blakely, Sokoloff, Taylor & Zafman

[57] ABSTRACT

An apparatus and method for configuring a computer system and a modem for use in multiple countries or with a plurality of different types of telephone networks is disclosed. The invention comprises: 1) a computer including a computer memory, a list of different types of telephone networks being stored in the computer memory; 2) a modem coupled to the computer, the modem including modem control logic and a modem memory coupled to the modem control logic, the modem memory containing a plurality of profiles, each profile of the plurality of profiles having information specific to a corresponding type of telephone network of the plurality of different types of telephone networks; and 3) processing logic operably disposed in the computer memory, the processing logic including: (a) logic for querying the modem for a list of profiles stored in the modem memory; (b) logic for comparing the list of different types of telephone networks from the computer memory with the list of profiles from the modem memory; and (c) logic for displaying a selection menu on the computer; the selection menu including telephone network types common to both the list of different types of telephone networks from the computer memory and the list of profiles from the modem memory. The invention includes logic for accepting a selection of a particular telephone network type from the selection menu; and logic for commanding the modem to configure itself for a telephone network type corresponding to the selection of a particular telephone network type.

20 Claims, 13 Drawing Sheets

1310

|        | USA  | GERMANY | FRANCE |
|--------|------|---------|--------|
| LINE 1 | TIP  | TIP     | TIP    |
| LINE 2 | RING | RING    | RING   |
| LINE 3 | OPEN | X       | OPEN   |
| LINE 4 | X    | X       | OPEN   |
| LINE 5 | X    | OPEN    | X      |
| LINE 6 | OPEN | OPEN    | X      |

APPARATUS AND METHOD FOR CONFIGURING A COMPUTER SYSTEM AND A MODEM FOR USE IN A PARTICULAR COUNTRY

BACKGROUND OF THE INVENTION

1. Field of the Invention

The present relates to the field of computer modems. Specifically, the present invention relates to the use of modems in different countries or various regions having different telephone interface protocols.

2. Description of Related Art

Modems are commonly used with computer systems to transfer information across a public telephone network. Modems are designed with a first interface for communicating with a computer system and a second interface for communicating with the telephone network. The telephone network interface must be compatible with the particular telephone network with which the modem will be used.

Portable computers are increasingly popular throughout the world. Portable computers are often used with modems. It is becoming more and more common for travelers to take portable computers with modems across international borders from one country to another. However telephone networks and related systems can vary substantially from country to country. In addition, protocols and regulations pertaining to telephone networks vary significantly from country to country. This diversity in telephone network systems creates a problem for computer and modem users. Currently, it is necessary for a computer user to carry multiple country-specific modems or to try to use a non-certified modem from a different country. The diversity of telephone systems also creates a major barrier for modem suppliers wishing to supply modems in more than one country.

Thus, a better method and apparatus for configuring a computer system and a modem for multiple countries is needed.

SUMMARY AND OBJECTS OF THE INVENTION

The present invention is an apparatus and method for configuring a computer system and a modem for operation in multiple countries or with a plurality of different types of telephone networks. The invention comprises: 1) a computer including a computer memory, a list of different types of telephone networks being stored in the computer memory; 2) a modem coupled to the computer, the modem including modem control logic and a modem memory coupled to the modem control logic, the modem memory containing a plurality of profiles, each profile of the plurality of profiles having information specific to a corresponding type of telephone network of the plurality of different types of telephone networks; and 3) processing logic operably disposed in the computer memory, the processing logic including: (a) logic for querying the modem for a list of profiles stored in the modem memory; (b) logic for comparing the list of different types of telephone networks from the computer memory with the list of profiles from the modem memory; and (c) logic for displaying a selection menu on the computer; the selection menu including telephone network types common to both the list of different types of telephone networks from the computer memory and the list of profiles from the modem memory. The present invention further includes logic for accepting a selection of a particular telephone network type from the selection menu; and logic for commanding the modem to configure itself for a telephone network type corresponding to the selection of a particular telephone network type.

The present invention also includes initialization logic operably disposed in a modem, the initialization logic includes: (a) means for reading a default telephone network type from a non-volatile memory on power-up or restart of the modem, (b) means for retrieving a profile of a plurality of profiles corresponding to the default telephone network type, (c) means for storing the profile in an active profile memory area in the modem memory, and (d) means for configuring the modem for a telephone network type corresponding to the profile stored in the active profile memory area in the modem memory.

In addition, the present invention includes a method and apparatus for automatically configuring a modem for operation with a particular telephone network type depending on a particular dial tone signature or a telephone interface plug jumper code.

It is therefore an advantage of the present invention to provide an apparatus and method for configuring a computer system and a modem for operation in multiple countries. It is a further advantage of the present invention to provide a means and method for automatically restoring a default country configuration for a modem on power-up. It is a further advantage of the present invention to provide a means and a method for automatically selecting an appropriate country-specific protocol based on an analysis of the telephone network interface.

These and other advantages of the present invention are fully described in the following detailed description of the preferred embodiment.

BRIEF DESCRIPTION OF THE DRAWINGS

FIG. 13 illustrates an example of the jumper configuration for the second embodiment of the automatic country configuration process.

DETAILED DESCRIPTION OF THE PREFERRED EMBODIMENT

The present invention is an apparatus and method for configuring a computer system and a modem for use in multiple countries. In the following detailed description, numerous specific details are set forth in order to provide a thorough understanding of the present invention. However, it will be apparent to one of ordinary skill in the art that these specific details need not be used to practice the present invention. In other instances, well known structures, interfaces, and processes have not been shown in detail in order not to unnecessarily obscure the present invention.

Figure 1:
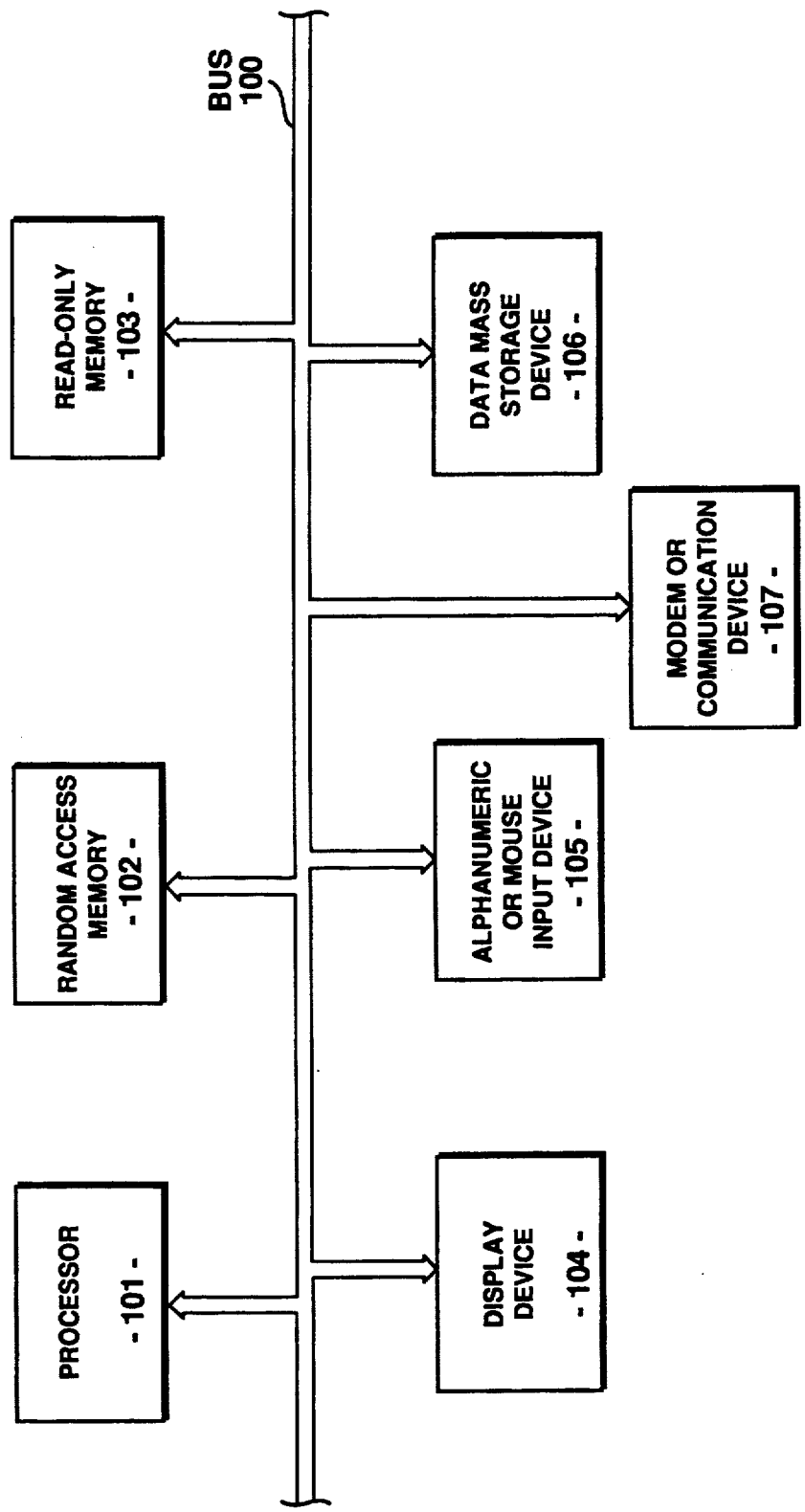
FIG. 1 is a block diagram illustrating the computer system hardware used in the preferred embodiment of the present invention.

Referring now to FIG. 1, a block diagram of the computer system hardware used in the preferred embodiment is illustrated. The computer system used in the preferred embodiment comprises a bus 100 for communicating information between computer system components. These components coupled to bus 100 include processor 101. In the preferred embodiment, processor 101 is an i486 or Pentium brand microprocessor manufactured by Intel Corporation, Santa Clara, Cal. The i486 and Pentium marks are registered trademarks of Intel Corporation. Other system components include random access memory (RAM) 102, read only memory (ROM) 103, and mass storage device or disk drive 106. The computer system of the preferred embodiment also includes display device 104 coupled to the bus 100 for displaying information to a computer user, and an alphanumeric or mouse input device 105 coupled to the bus 100 for communicating information and command selections to the processor 101. In addition, the computer system of the preferred embodiment includes an interface to a modem or communication device 107 which can be coupled to bus 100. In the preferred embodiment, modem 107 is a PCMCIA type modem card which can be removably inserted into a receptacle in the computer system. This receptacle is internally coupled to bus 100. Thus, processor 101 may interface with a card modem 107 through bus 100. Modems of this type are well know to those of ordinary skill in the art.

Display device 104 may be a liquid crystal device, cathode ray tube, or other suitable display device. Alphanumeric input device 105 is typically an alphanumeric or function key keyboard. In addition, the mouse input device 105 may be a pointing device or track ball device allowing the computer user to dynamically signal the two dimensional movement of a visible symbol (i.e., cursor) on the display screen of the display device 104.

Figure 2:
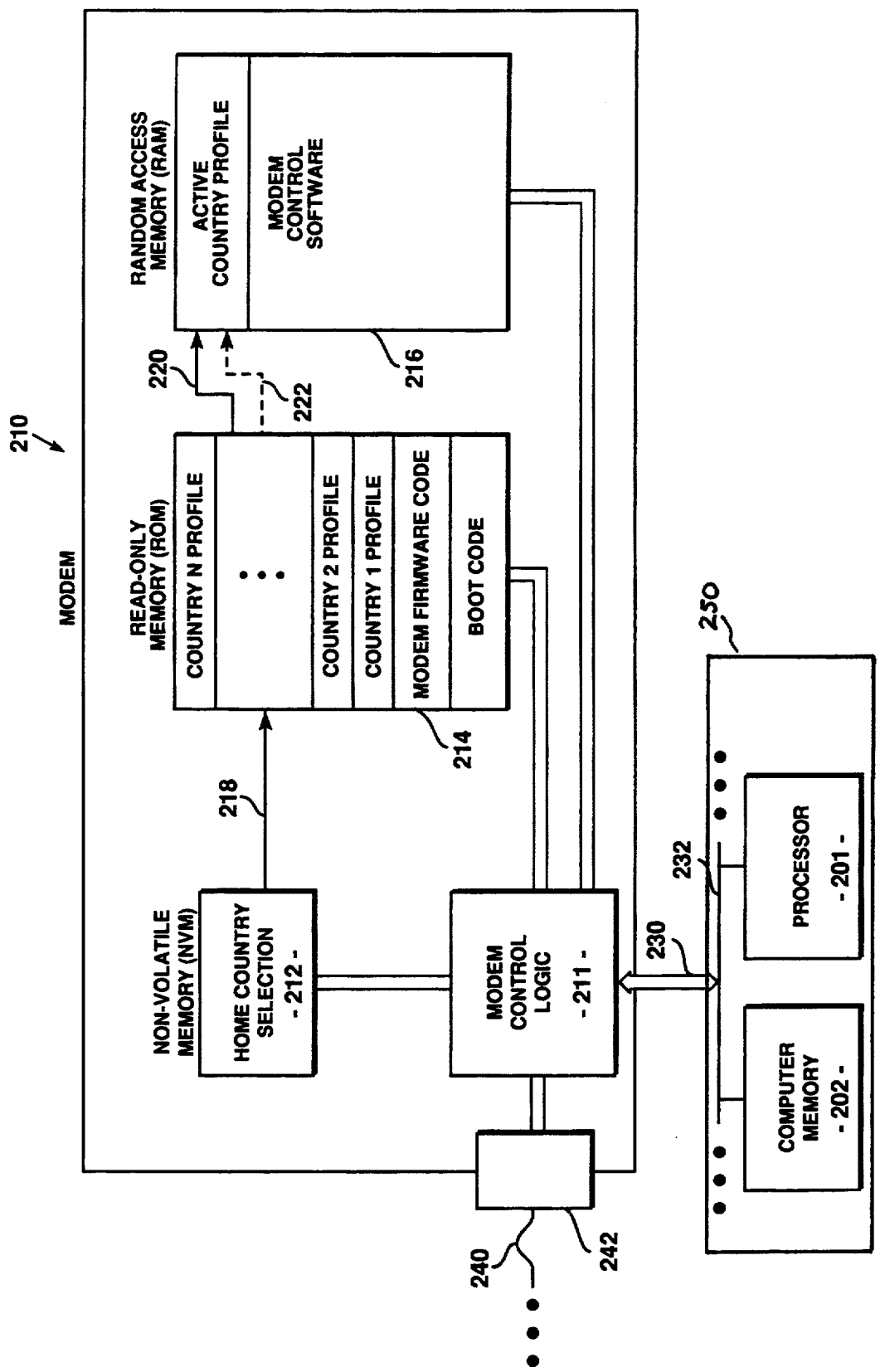
FIG. 2 illustrates the architecture of the modem used in the preferred embodiment.

Referring now to FIG. 2, the internal architecture of modem 210 is illustrated. Modem 210 comprises modem control logic 211 which includes circuitry for performing well known low level operations of the modem. Modem control logic 211 also includes an embedded processor (not shown) for executing instructions retrieved from a modem read only memory (ROM) 214 or a modem random access memory (RAM) 216. Modem ROM 214 includes modem firmware (code) that defines the well known operations of the modem. Similarly, modem ROM 214 includes boot code for initializing the modem 210 upon initial power up. Modem RAM 216 includes modem control software for performing well known functions within modem 210.

Modem control logic 211 is coupled to a computer system 250 via a host computer bus 232 and a host or computer interface 230. Host interface 230 is used by modem 210 for communicating with a processor 201 of computer system 250 to which modem 210 is coupled. Such a computer system 250 includes a computer memory 202 for storage of instructions and data for use by processor 201.

Modem 210 includes a telephone network interface 242 for coupling modem 210 to a telephone line 240. Telephone line 240 is typically coupled to telephone network interface 242 using a plug compatible with the particular telephone network with which modem 210 is being used. An RJ-11 type plug is commonly used in the U.S. Telephone line 240 comprises a set of signal lines and protocols specific to a particular telephone network. Such signals and protocols often vary from country to country or telephone network to telephone network. It is necessary for modem 210 to be properly configured for the particular telephone network to which modem 210 is coupled. The present invention provides a means by which computer system 250 may command modem control logic 211 to access country specific profile information for properly configuring the operation of modem 210. The present invention allows computer system 250 and modem control logic 211 to support a plurality of country specific modem configurations.

Modem ROM 214 includes a set of country profiles, which define information necessary for configuring the telephone network interface 242 for a particular country specific telephone network. The information contained within a particular country profile is illustrated in FIG. 3(A).

Figures 3A, 3B, 3C:
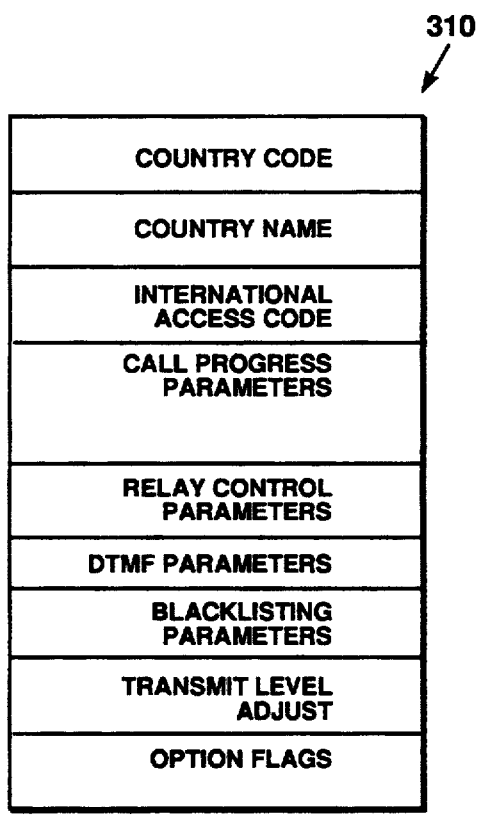
FIGS. 3(A), 3(B), and 3(C) illustrate the data content of a country profile.

Referring now to FIG. 3(A), the information contained within a country profile 310 is illustrated. Country profile 310 contains parameters used to configure certain characteristics of the modem to meet local public telephone and telegraph regulations. The country profile 310 is implemented as a data structure contained within modem ROM 214. Country profile 310 comprises a country code which defines a unique number specific to each country. A country name defines a three character ASCII text string used to identify a particular country. The international access code is a dialing code used to call a particular country. The call progress parameters define a table that contains parameters for detection of call progress tones including dial tone, ring tones, and busy tones. The relay control parameters are values used for controlling relays in a Data Access Arrangement (DAA). As well known to those of ordinary skill in the art, the DAA is often coupled between the modem and the telephone line. The DTMF parameters define parameters used for DTMF dialing. DTMF dialing is well known in the art. The black listing parameters are used to define the type of black listing required for each call failure. Black listing techniques are well known to those of ordinary skill in the art. The transmit level adjust parameter is used to adjust the preferred transmit level for a particular telephone network. The option flags of the country profile 310 are used to enable or disable modem functions. It will be apparent to one of ordinary skill in the art that additional country specific modem parameters may be included in the country profile 310.

Referring now for FIGS. 3(B) and 3(C), examples of a country profile for a particular country are illustrated. For example, FIG. 3(B) illustrates a country profile 320 for use with a telephone network in the United States. In this case, the country profile parameters are set to define information compatible with the U.S. telephone network protocols and regulations. Referring to FIG. 3(C), a country profile 330 illustrates an example of a country profile for use in the United Kingdom. In this case, the country profile parameters are set to define information compatible with the operation of the telephone network in the UK.

Referring again to FIG. 2, a plurality of country profiles of the type described above are stored in modem ROM 214. The set of country profiles stored in modem ROM 214 define the entire set of specific countries supported by modem 210. It will be apparent to one of ordinary skill in the art that a particular modem may support an arbitrary predetermined set of countries.

Modem 210 includes a non-volatile memory (NVM) 212. Many types of non-volatile memories may be used including flash memory or EPROM memory. In the present invention, modem non-volatile memory 212 is used for the storage of a home country default selection. As will be described below, the present invention includes an automatic home country default process for automatically restoring the configuration of modem 210 to a predefined home country selection when power to the modem 210 is turned off and then turned on. In this manner, the inadvertent use of modem 210 with an incorrect country profile is eliminated. This aspect of the present invention is described below in connection with the processing logic illustrated in FIGS. 7 and 8.

Modem 210 includes an active country profile memory area within modem RAM 216. The active country profile is used by modem control logic 211 to configure telephone network interface 242 for the normal operation of modem 210. Using the processing steps described below, the active country default profile memory area of modem RAM 216 is loaded with a home country profile or a user selected country profile. The subsequent operation of modem 210 is driven by the profile stored in the active country profile of modem RAM 216.

The processing logic of the present invention is stored and executed partially within the computer system 250 and partially within modem 210. These two portions of processing logic operate cooperatively to establish a desired country profile within modem 210. The computer system 250 portion of processing logic is stored in computer memory 202 and executed by processor 201. The modem 210 portion of this processing logic is stored in modem ROM 214 or modem RAM 216 and executed by an embedded processor (not shown) within modem control logic 211. The processing logic within the computer system 250 that is executed by processor 201 acts as client software which makes requests to server software or firmware within modem 210 across bus 232 and interface 230. A user provides input and command selections to the computer system 250 to initiate and interact with the processing logic of the present invention. Once initiated, the processing logic of the present invention operates in a manner illustrated in FIGS. 4 through 13.

Figure 9:
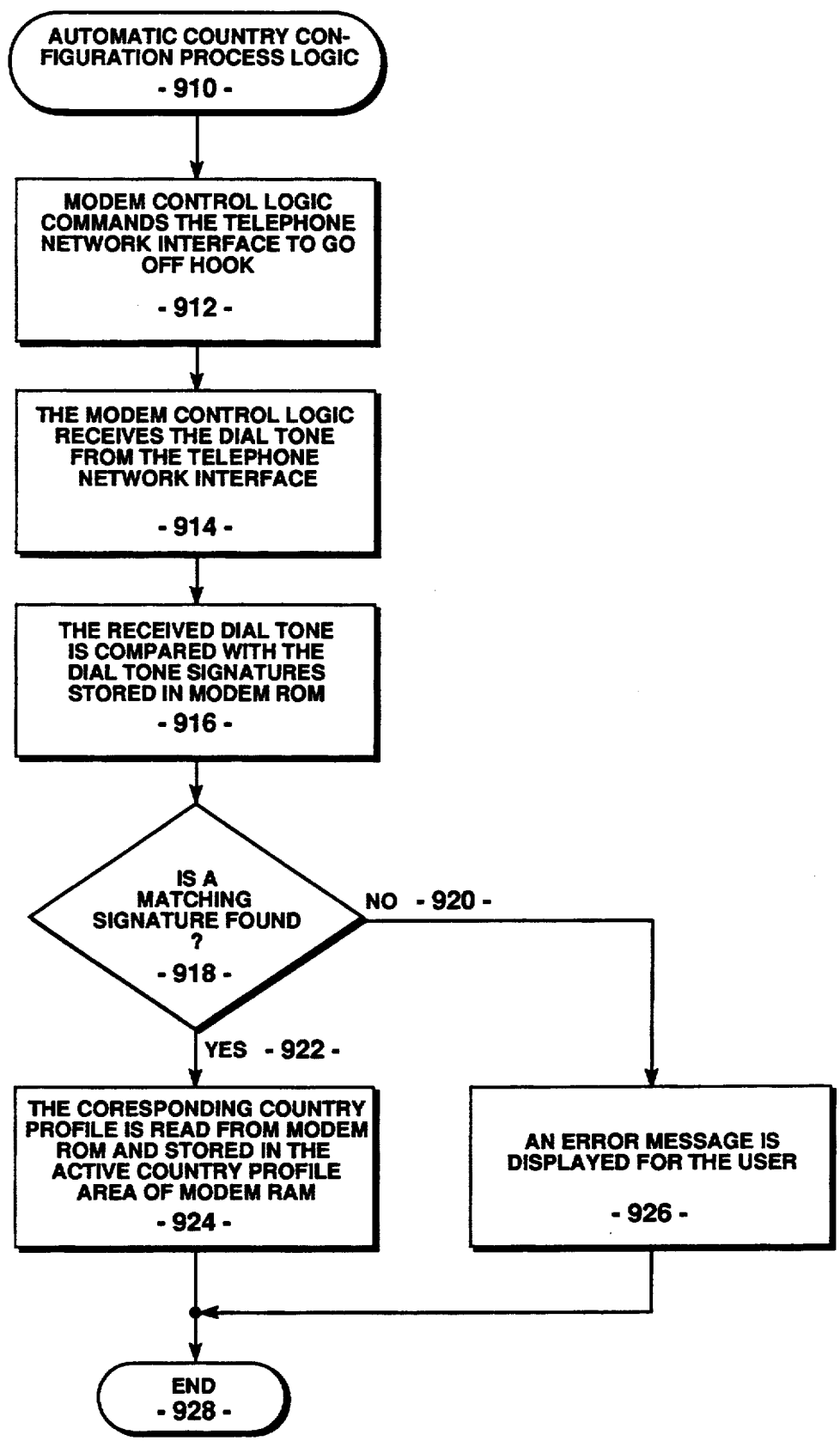
FIG. 9 is a flow chart illustrating a first embodiment of the automatic country configuration processing logic of the present invention.
Figure 10:
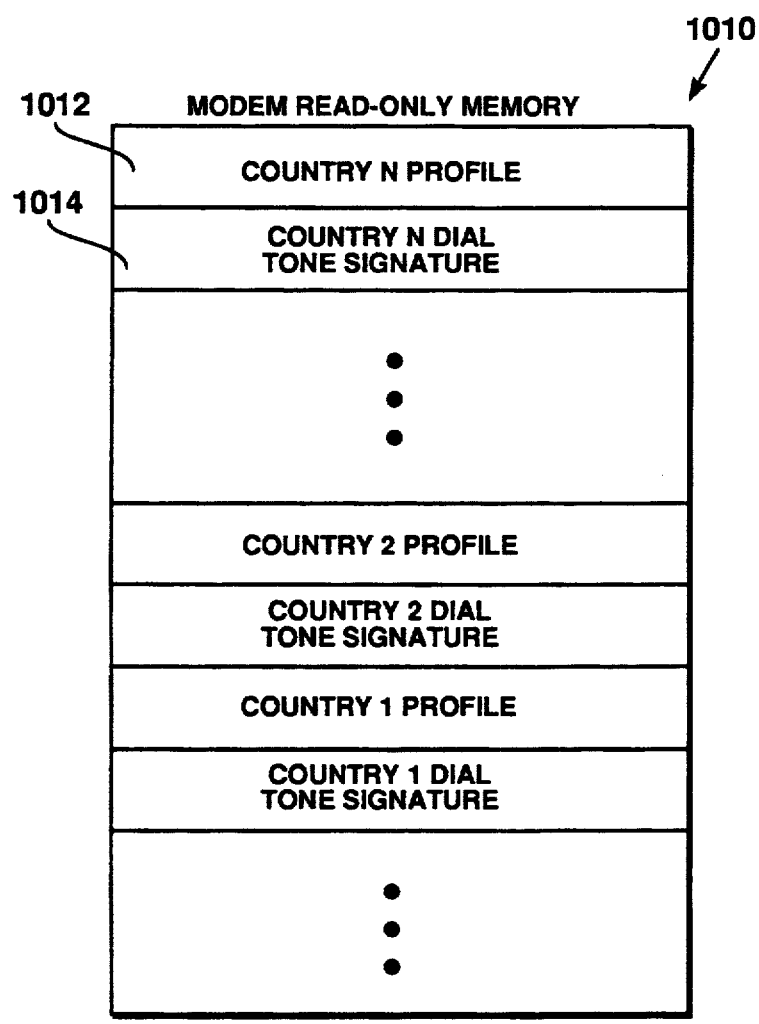
FIG. 10 illustrates the content of modem ROM in the first embodiment of the automatic country configuration process.
Figure 11:
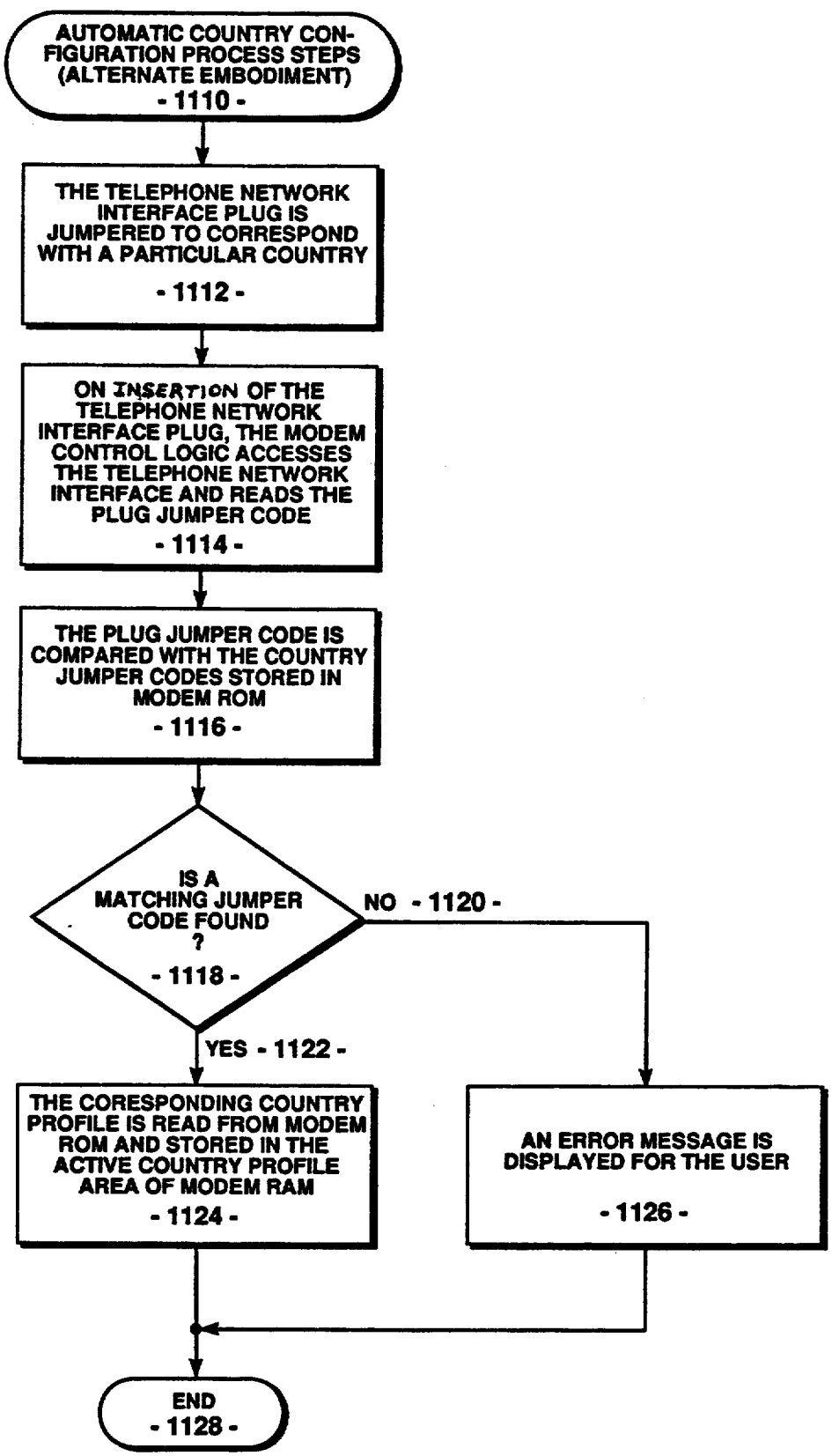
FIG. 11 is a flow chart illustrating a second embodiment of the automatic country configuration process logic of the present invention.
Figure 12:
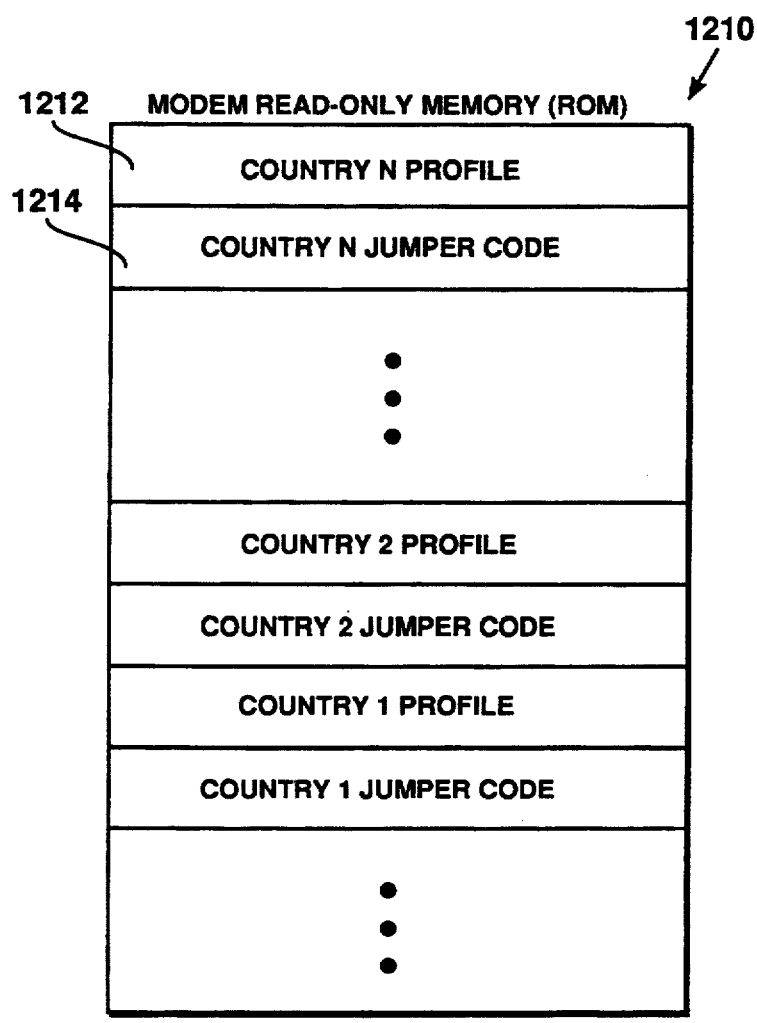
FIG. 12 illustrates the content of modem ROM in the second embodiment of the automatic country configuration process.

The processing logic of the present invention can be logically divided into three separate features. First, the present invention performs a user selectable configuration of modem 210 for a particular country. This feature is supported by the country configuration processing logic 410 illustrated in FIGS. 4 through 6, which are described in detail below. The second feature of the present invention is the automatic restoration of a home country default when power to modem 210 is cycled. This feature is supported by the automatic home country default process steps 710 illustrated in FIGS. 7 and 8. The third feature of the present invention is an automatic configuration of modem 210 for a particular country based on an analysis of the telephone network interface without user interaction. This feature of the present invention is described in two embodiments of the automatic country configuration processing logic. The first embodiment is illustrated in FIGS. 9 and 10. The second embodiment of the automatic country configuration processing logic is illustrated in FIGS. 11 through 13. Each of these features of the present invention and the corresponding processing logic and process steps are described below in connection with the figures provided herein.

Figure 4:
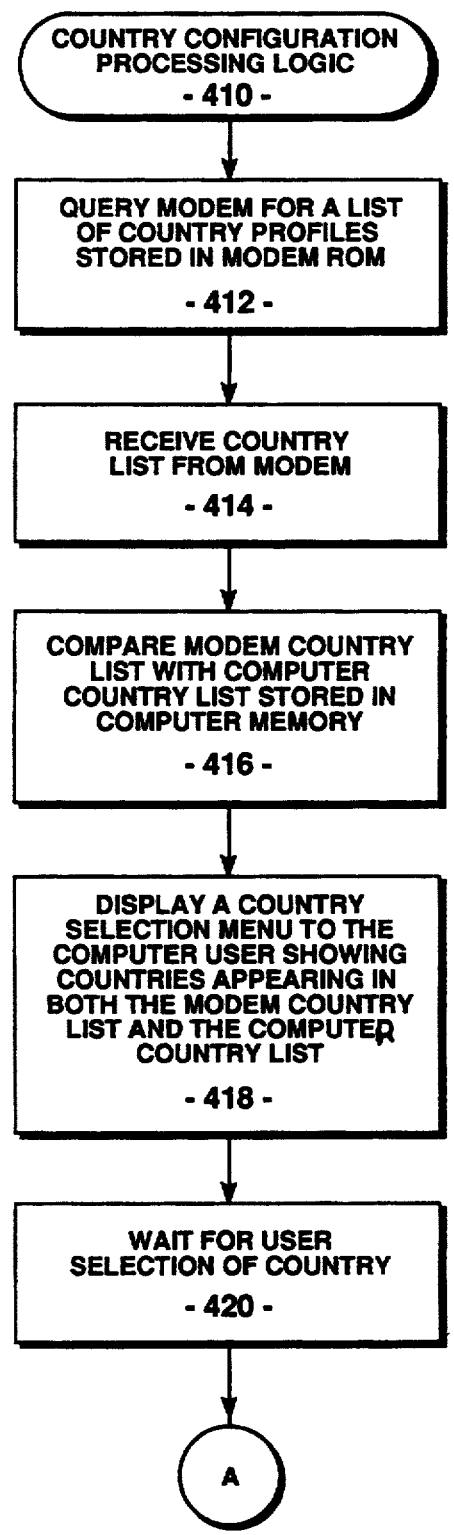
FIGS. 4 and 5 are flow charts illustrating the country configuration processing logic and process steps of the preferred embodiment of the present invention.

Referring now to FIG. 4, the country configuration processing logic 410 is illustrated. Country configuration processing logic 410 is initiated by operator action on computer system 250. When this logic is activated, computer system 250 queries modem 210 for a list of country profiles stored in modem ROM 214 (processing block 412). Modem control logic 211 in modem 210 accesses modem ROM 214 and obtains a list of country profiles stored therein. This list of modem country profiles is sent to computer system 250 across interface 230. Computer system 250 receives the modem country list from modem 210 in processing block 414. Computer system 250 compares the modem country list with a computer country list stored in computer memory 202 of computer system 250 (processing block 416). Computer system 250 displays a country selection menu to the computer user in processing block 418. The country selection menu shows those countries appearing in both the modem country list and the computer country list. The computer system 250 then waits for the user to select a country displayed in the country selection menu (processing block 420). Processing for the country configuration processing logic 410 then continues at the bubble labeled A illustrated in FIG. 5.

Figure 6:
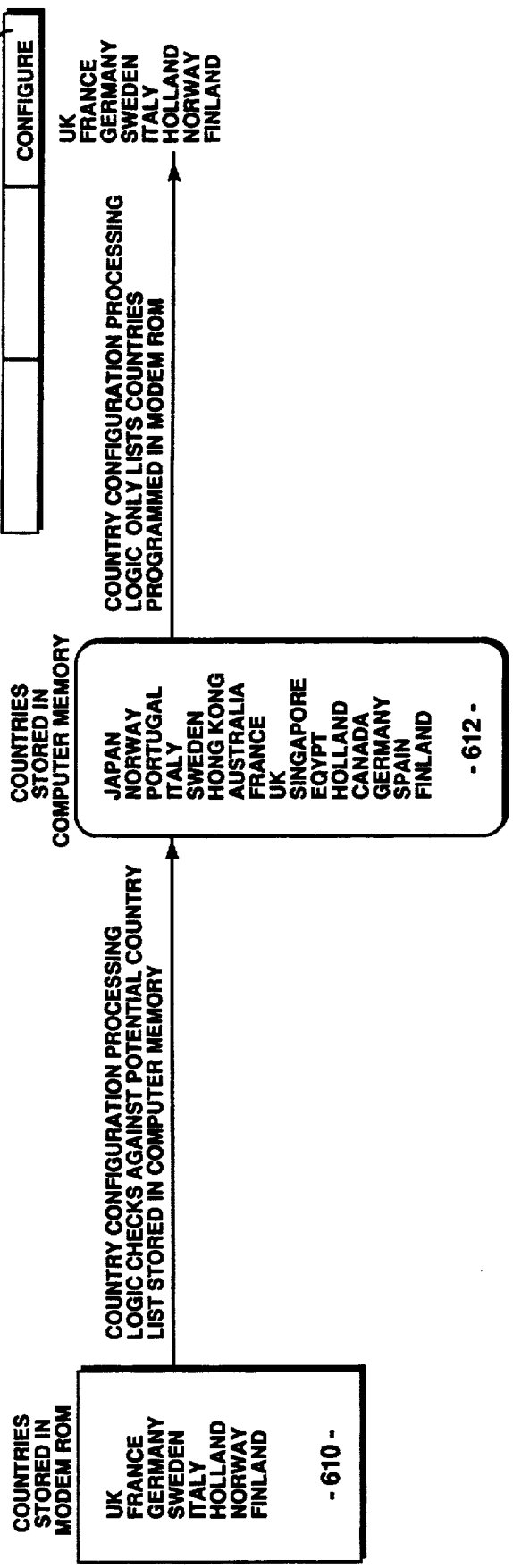
FIG. 6 illustrates the processing of the modem country list and the computer country list to produce a pull-down menu of country choices.

Referring now to FIG. 6, an example of the processing performed by the logic illustrated in FIG. 4 is illustrated. Block 610 comprises a list of country profiles stored in modem ROM 214. Block 612 represents a list of countries stored in computer memory 202 of computer system 250. The country configuration processing logic compares the list from block 610 with the list from block 612 and produces a list of countries common to both lists, which are presented in a pull-down menu 614 on the display device 104 of computer system 250. It will be apparent to one of ordinary skill in the art that other means for enabling a user to select from a plurality of countries may be implemented.

Figure 5:
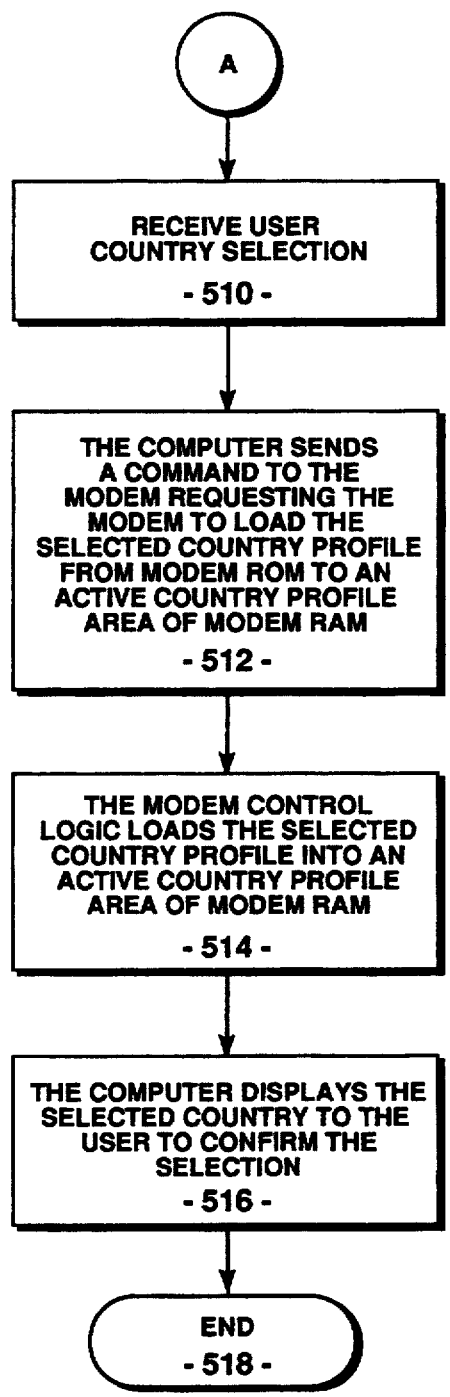

Referring now to FIG. 5, the country configuration processing logic 410 continues at the bubble labeled A. When the user of computer system 250 makes a selection from the country configuration pull-down menu, the processing logic of the present invention receives the country selection in processing block 510. Computer system 250 generates a command with this country selection and sends the command to modem 210 requesting the modem 210 to load the selected country profile from modem ROM 214 into the active country profile area of modem RAM 216 (processing block 512). In response to this command from computer system 250, modem control logic 211 loads the selected country profile into the active country profile area of modem RAM 216 (processing block 514). Once modem 210 has loaded the active country profile in modem RAM 216, computer system 250 displays the selected country to the user to confirm the country selection (processing block 516). Processing for the country configuration processing logic 410 then terminates at end bubble 518.

Figure 7:
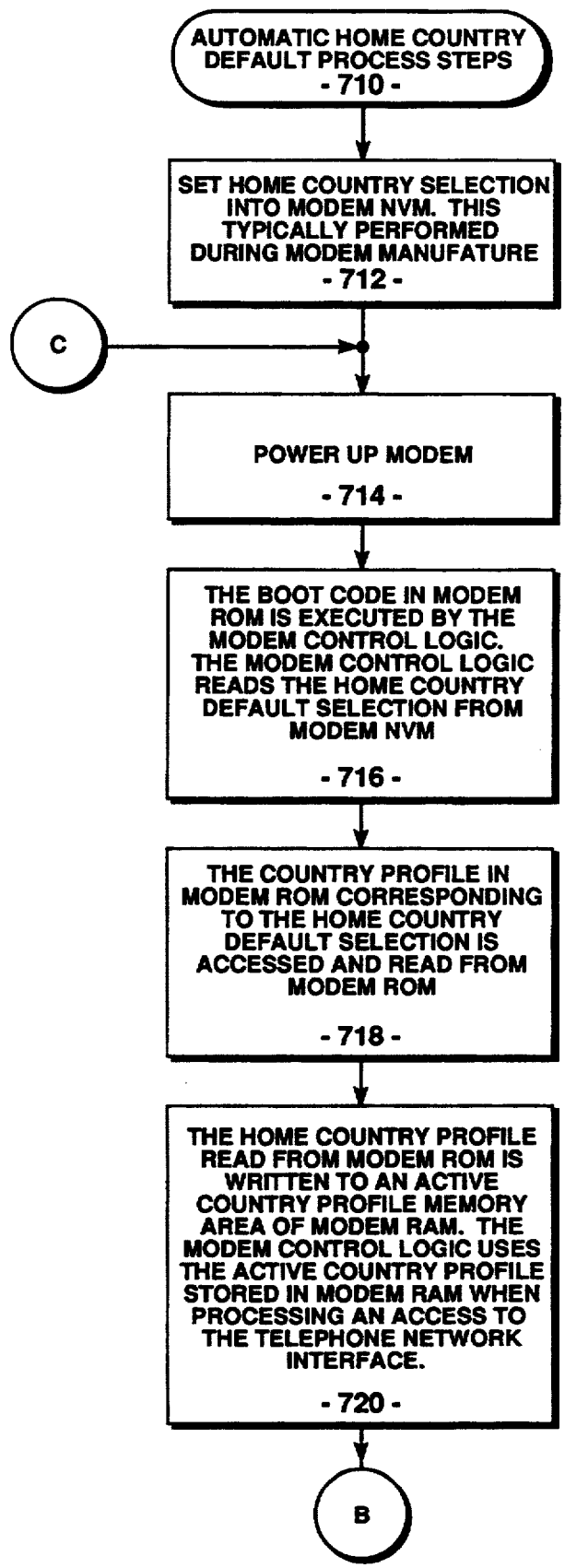
FIGS. 7 and 8 are flow charts illustrating the automatic home country default process steps.

The automatic home country default process steps 710 are illustrated starting in FIG. 7. This processing logic automatically restores the country configuration of a modem to a predefined home country default when power to the modem is cycled from off to on. The automatic restoration of a home country default eliminates the inadvertent use of an incorrect country profile. A home country default selection is initially pre-stored in non-volatile memory 212 of modem 210. This operation is typically performed during modem manufacture; however, the initialization of a home country default selection may be performed by a user as well. Because the home country default selection is maintained in non-volatile memory, the home country default is retained when modem power is removed (processing block 712). In the next step of the automatic home country default process, modem 210 is powered up (processing block 714). The boot code in modem ROM 214 is executed by modem control logic 211 in processing block 716. Modem control logic 211 reads the home country default selection from modem non-volatile memory 212 in processing block 716. The country profile stored in modem ROM 214 that corresponds to the home country default selection is accessed and read from modem ROM 214 in processing block 718. The home country profile read from modem ROM 214 is written to the active country profile memory area of modem RAM 216 in processing block 720. Modem control logic 211 uses the active country profile stored in modem RAM 216 when processing an access to the telephone network interface 242 (processing block 720). Processing for the automatic home country default process of the present invention then continues through the bubble labeled B illustrated in FIG. 8.

Figure 8:
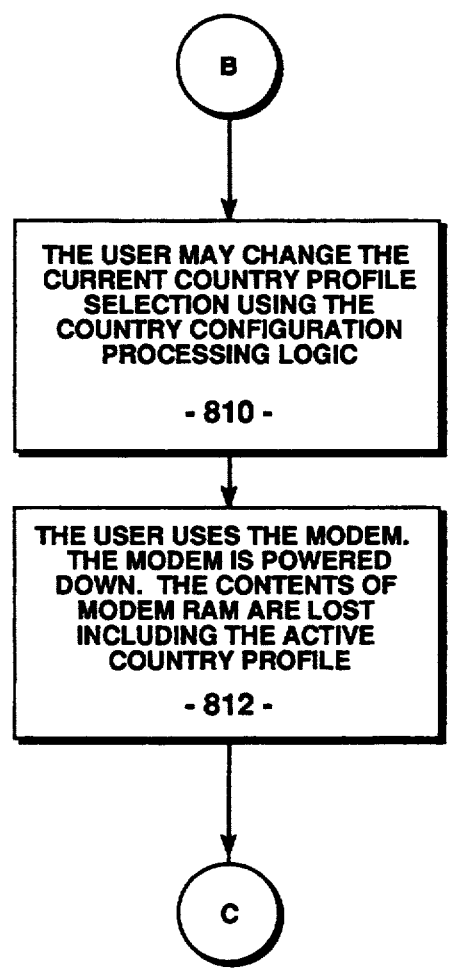

Referring now to FIG. 8, the automatic home country default process continues at the bubble labeled B. At this point in the process, the home country default selection is stored in the active country profile memory area of modem RAM 216 as indicated by line 220 illustrated in FIG. 2. The initialization steps of modem 210 are now complete. At any time during subsequent operation of computer system 250, the user of computer system 250 may initiate the country configuration processing logic 410 described above in connection with FIG. 4. Using the country configuration processing logic, the user may change the current country profile selection in the active country profile memory area of modem RAM 216. This modification of the active country profile is indicated by dashed line 222 illustrated in FIG. 2. Because modem control logic 211 uses the country profile stored in the active country profile memory area of modem RAM 216 during normal operation of modem 210, the most recent modification of the active country profile will define the modem configuration used within modem 210. The user of computer system 250 may then use this desired modem configuration. When modem 210 is powered-down, however the contents of modem RAM 216 are lost (processing block 812). When power to modem 210 is reapplied, the automatic home country default process loops back to the bubble labeled C illustrated in FIG. 7 where the initialization logic of modem 210 again loads the active country profile memory area of modem RAM 216 with the predefined home country selection stored in modem non-volatile memory 21.2. In this manner, the configuration of modem 210 always reverts back to the home country selection when power to modem 210 is cycled.

The country configuration processing logic 410 described above in connection with FIGS. 4 through 6 employs a user interactive method for allowing a user to specify a desired country configuration. The present invention also provides a means whereby the appropriate country configuration is determined and configured without user interaction. This process is implemented in the present invention using automatic country configuration processing logic. Two embodiments of this processing logic are described herein. First, automatic country configuration processing logic 910 describes a means whereby a particular modem configuration is determined using analysis of the phone line dial tone. This embodiment is described below in connection with FIGS. 9 and 10. A second embodiment of the automatic country configuration process uses jumpers within the telephone network interface plug to specify a particular country configuration. This embodiment of the present invention is described below in connection with FIGS. 11 through 13.

Referring now to FIG. 9, the first embodiment of the automatic country configuration processing logic 910 is described. In the first embodiment, the country or particular type of telephone network is determined by analysis of the dial tone received on the telephone line 240. It is well known that particular dial tone signatures are unique to a particular telephone network. These dial tone signatures may be coded into a set of parameters or digitally sampled data suitable for storage in a computer memory as binary information. As illustrated in FIG. 10, a dial tone signature 1014 for each country is stored in modem ROM 214 along with a corresponding country profile 1012. In this manner, a particular dial tone signature is associated with a particular country profile. Referring again to FIG. 9, the automatic country configuration processing logic 910 begins with modem control logic 211 commanding the telephone network interface 242 to go off-hook in processing block 912. The modem control logic 211 receives the dial tone from the telephone network interface 242 in processing block 914. The received dial tone is compared with the dial tone signatures stored in modem ROM 214 in processing block 916. If a matching dial tone signature is found (decision block 918), processing path 922 is taken to processing block 924. In this case, the country profile corresponding to the matching dial tone signature is read from modem ROM 214 and stored in the active country profile area of modem RAM 216 in processing block 924. Processing for the automatic country configuration process then terminates through end bubble 928. If a matching dial tone signature is not found, processing path 920 is taken to processing block 926 where an error message is displayed to the user of computer system 250. In this case, the automatic country configuration processing logic is unable to identify the dial tone signature or a corresponding country. In this situation the user may use the home country default selection or the country configuration processing logic may be employed for explicitly selecting a particular configuration. Processing for the automatic country configuration process of the first embodiment then terminates through end bubble 928.

Referring now to FIG. 11, the second embodiment of the automatic country configuration process of the present invention is illustrated. In the second embodiment, jumpers on a telephone network interface plug are used to define a configuration specific to a particular country or telephone network. In this manner, each telephone network interface plug has a unique jumper configuration that identifies the type of plug to modem 210. Once the plug and its associated country are known, modem 210 automatically configures itself to that country. The jumpering configuration is carried out using unused lines in the standard telephone cable. For the normal operation of modem 210, only two lines (tip and ring) are necessary. Other signal lines of the telephone network interface are unused. In a typical telephone network interface plug, there are six signal lines provided, only two of which are used for tip and ring. FIG. 13 illustrates an example of the usage of the six telephone signal lines for three sample countries. In this example, telephone network interface lines 1 and 2 are used for tip and ring modem operation in a conventional manner. Lines 3 though 6 of the telephone network interface are unused for the modem and are available for jumpering in the present invention. By jumpering or not jumpering lines 3 through 6 in a unique way, a particular country may be identified. For example, a telephone network interface plug for use in the United States is jumpered on lines 4 and 5. These lines may be tied to ground or tied to a power source depending on a particular implementation. Lines 3 and 6 are left open. Using the same technique other countries are uniquely jumpered as shown by example in FIG. 13. Once the unique jumper configuration for each country is determined, the jumper configuration can be coded into a digital form and stored in modem ROM 214. Referring to FIG. 12, a unique jumper code 1214 for each country is stored in modem ROM 214 in correspondence with its associated country profile 1212. In this manner, a plurality of country profiles and there associated jumper codes are stored in modem ROM 214.

Referring now to FIG. 11, the second embodiment of the automatic country configuration process 1110 of the present invention is illustrated. In processing block 1112, the telephone network interface plug is uniquely jumpered to correspond with a particular country. When the telephone network interface plug is coupled to modem 210, the modem control logic 211 accesses the telephone network interface and reads the plug jumper code configured therein (processing block 1114). The plug jumper code thus read is compared with the country jumper codes stored in modem ROM 214 in processing block 1116. If a matching jumper code is found in modem ROM 214 (decision block 1118), processing path 1122 is taken to processing block 1124. In this case, the country profile corresponding to the matching jumper code found in modem ROM 214 is read from modem ROM 214 and stored in the active country profile area of modem RAM 216 (processing block 1124). Processing for the automatic country configuration process then terminates through end bubble 1128. If a matching jumper code is not found in modem ROM 214, processing path 1120 is taken to processing block 1126 where an error message is displayed for the user of computer system 250. In this case, the automatic country configuration processing logic was unable to uniquely identify a country based on the jumper code read from the telephone network interface plug. In this situation, the user can use the predefined home country default selection or explicitly select the country configuration using country configuration processing logic 410 described above. Processing for the second embodiment of the automatic country configuration process then terminates through end bubble 1128.

Thus, an apparatus and method for configuring a computer system and a modem for use in multiple countries is disclosed. These specific arrangements and methods described herein are merely illustrative of the principles of this invention. Numerous modifications in form and detail may be made by those of ordinary skill in the art without departing from the scope of the present invention. Although this invention has been shown in relation to a particular embodiment, it should not be considered so limited. Rather, the present invention is limited only by the scope of the appended claims.

We claim:

1. A system for configuring a computer system for operation with a plurality of different types of telephone networks, said system comprising:

a computer including a computer memory, a list of different types of telephone networks being stored in said computer memory;

a modem coupled to said computer, said modem including modem control logic and a modem memory coupled to said modem control logic, said modem memory containing a plurality of profiles, each profile of said plurality of profiles having information specific to a corresponding type of telephone network of said plurality of different types of telephone networks; and processing logic operably disposed in said computer memory, said processing logic including, (a) logic for querying said modem for a list of profiles stored in said modem memory, (b) logic for comparing said list of different types of telephone networks from said computer memory with said list of profiles from said modem memory, and (c) logic for displaying a selection menu on said computer; said selection menu including telephone network types common to both said list of different types of telephone networks from said computer memory and said list of profiles from said modem memory.

2. The system as claimed in claim 1 wherein said processing logic further includes:

logic for accepting a selection of a particular telephone network type from said selection menu; and logic for commanding said modem to configure itself for a telephone network type corresponding to said selection of a particular telephone network type.

3. The system as claimed in claim 2 wherein said logic for commanding said modem further includes logic for commanding said modem to load a profile of said plurality of profiles corresponding to said selection of a particular telephone network type, said profile being loaded into an active profile memory area of said modem memory.

4. The system as claimed in claim 1 wherein said modem further includes:

a non-volatile memory, said non-volatile memory containing a default telephone network type; and initialization logic operably disposed in said modem, said initialization logic including:

(a) means for reading said default telephone network type from said non-volatile memory on power-up or restart of said modem, (b) means for retrieving a profile of said plurality of profiles corresponding to said default telephone network type, (c) means for storing said profile in an active profile memory area in said modem memory, and (d) means for configuring said modem for a telephone network type corresponding to said profile stored in said active profile memory area in said modem memory.

5. The system as claimed in claim 2 wherein said modem communicates via a telephone network line in a manner corresponding to said selection of a particular telephone network type.

6. The system as claimed in claim 3 wherein said modem communicates via a telephone network line in a manner corresponding to said profile stored in said active profile memory area in said modem memory.

7. The system as claimed in claim 4 wherein said modem communicates via a telephone network line in a manner corresponding to said profile stored in said active profile memory area in said modem memory.

8. In a modem having a modem memory and a telephone network interface, said modem memory containing a plurality of profiles, each profile of said plurality of profiles having information specific to a corresponding type of telephone network of a plurality of different types of telephone networks, an apparatus for automatically configuring said modem with a telephone network type, said apparatus comprising:

means for obtaining a dial tone signature from said telephone network interface;

means for comparing said dial tone signature from said telephone network interface with a plurality of dial tone signatures stored in said modem memory;

means for saving a matching dial tone signature, said matching dial tone signature matching a dial tone signature obtained from said telephone network interface and one of a plurality of dial tone signatures stored in said modem memory;

means for retrieving a profile of said plurality of profiles corresponding to said matching dial tone signature;

means for storing said profile in an active profile memory area in said modem memory, and means for configuring said modem for a telephone network type corresponding to said profile stored in said active profile memory area in said modem memory.

9. The apparatus as claimed in claim 8 wherein said modem communicates via a telephone network line in a manner corresponding to said profile stored in said active profile memory area in said modem memory.

10. A computer system comprising an apparatus for configuring the computer system for operation with a plurality of different types of telephone networks, said system comprising:

a display;

a computer memory comprising an identification of different types of telephone networks;

a modem having a modem memory comprising a plurality of profiles, each profile identifying a type of telephone network the modem can operate with;

means for querying the modem for the plurality of profiles;

means for comparing the plurality of profiles with the identified types of telephone networks in computer memory;

means for displaying a selection menu on the display; said selection menu including telephone network types common to both said identified types of telephone networks and said plurality of profiles.

11. The apparatus as claimed in 10 further comprising:

means for accepting a selection of a particular telephone network type from said selection menu; and means for commanding said modem to configure itself for a telephone network type corresponding to said selection of a particular telephone network type.

12. The apparatus claimed in claim 11 wherein said means for commanding said modem further includes means for commanding said modem to load a profile of said plurality of profiles corresponding to said selection of a particular telephone network type, said profile being loaded into an active profile memory area of said modem memory.

13. The apparatus as claimed in claim 12 wherein said modem communicates via a telephone network line in a manner corresponding to said profile stored in said active profile memory area in said modem memory.

14. In a computer system including a computer memory, a list of different types of telephone networks being stored in said computer memory, a process for configuring said computer system for operation with a plurality of different types of telephone networks, said process comprising the steps of:

querying a modem for a list of profiles of a plurality of profiles stored in a modem memory of said modem;

comparing said list of different types of telephone networks from said computer memory with said list of profiles from said modem memory, and displaying a selection menu on said computer system; said selection menu including telephone network types common to both said list of different types of telephone networks from said computer memory and said list of profiles from said modem memory.

15. The process as claimed in claim 14 further including the steps of:

accepting a selection of a particular telephone network type from said selection menu; and commanding said modem to configure itself for a telephone network type corresponding to said selection of a particular telephone network type.

16. The process as claimed in claim 15 wherein said modem communicates via a telephone network line in a manner corresponding to said selection of a particular telephone network type.

17. The process as claimed in claim 15 wherein said modem communicates via a telephone network line in a manner corresponding to said selection of a particular telephone network type.

18. The process as claimed in claim 15 wherein said step of commanding said modem further includes the step of commanding said modem to load a profile of said plurality of profiles corresponding to said selection of a particular telephone network type, said profile being loaded into an active profile memory area of said modem memory.

19. The process as claimed in claim 18 wherein said modem communicates via a telephone network line in a manner corresponding to said profile stored in said active profile memory area in said modem memory.

20. The process as claimed in claim 18 wherein said modem communicates via a telephone network line in a manner corresponding to said profile stored in said active profile memory area in said modem memory.

* * * * *

UNITED STATES PATENT AND TRADEMARK OFFICE
CERTIFICATE OF CORRECTION

PATENT NO. : 5,430,793
DATED : July 4, 1995
INVENTOR(S) : Ueltzen et al.

It is certified that error appears in the above-indentified patent and that said Letters Patent is hereby corrected as shown below:

In column 8 at line 4 delete "21.2." and insert --212.--

In column 9 at line 11 delete "carded" and insert --carried--

Signed and Sealed this

Twenty-fourth Day of December, 1996

Attest:

BRUCE LEHMAN

Attesting Officer

Commissioner of Patents and Trademarks